INVENTOR
H. M. ZENOR
BY
ATTORNEY

Aug. 26, 1947.    H. M. ZENOR    2,426,256
SWEEP CIRCUIT
Filed July 8, 1944    2 Sheets-Sheet 2

INVENTOR
H. M. ZENOR
BY Paul B. Hunter
ATTORNEY

Patented Aug. 26, 1947

2,426,256

UNITED STATES PATENT OFFICE 2,426,256

SWEEP CIRCUIT

Hughes M. Zenor, Tulsa, Okla., assignor to Sperry Gyroscope Company, Inc., a corporation of New York Application July 8, 1944, Serial No. 544,062

12 Claims. (Cl. 320—1)

1

My invention relates to electric discharge device circuits and concerns, particularly, condenser-charging and discharging circuits.

An object of my invention is to provide improved apparatus and methods for generating sweep voltage and current for use in cathode ray oscilloscopes and the like.

Another object is to maintain substantial linearity of condenser-charging current.

A further object of the invention is to provide more nearly linear sweeps while avoiding high voltage or the use of amplification stages.

A further object of the invention is to provide means for correcting deviation from linearity of sweep in which the correction is a function of the error rather than a function of the entire sweep voltage or current.

Still another object of the invention is to provide relatively large amplitude linear sweeps in comparison with the power supply voltage so as to eliminate any need for alternating-current or direct-current amplifiers and thereby avoid the effects of zero shift or zero wandering of amplification stages.

Other and further objects and advantages will become apparent as the description proceeds.

In producing traces and indications of data on the fluorescent screens of cathode ray indicator tubes or oscilloscopes, extensive use is made of sweep circuits for applying suitable voltages to deflection plates or for passing currents through deflection coils in order to cause cathode ray beams of a cathode ray tube to be swept transversely. It is ordinarily desirable to obtain a high degree of linearity in the sweep voltage or current. A uniformly varying sweep voltage (or current) may be produced by passing a charging (or discharging) current through a sweep condenser in series with a resistor. The actual charging or discharging current curve and the condenser voltage curve are theoretically exponential, but if only a small portion of the curve is employed an approximate linear sweep may be obtained by using a simple resistance-charging circuit. For example, a linear sweep wave having an accuracy of one part in 1600 may be obtained from a thousand volt source if the condenser voltage is allowed to swing no more than $3\frac{2}{10}$ volts, and if triggering circuits for intermittently discharging the condenser are employed which operate consistently within two millivolts.

A greater output voltage in proportion to the voltage of the power supply may be obtained if means are employed for maintaining the current through the charging-current-carrying resistor

2 substantially constant. It is, accordingly, an object of my invention to provide means for causing the charging current to remain substantially constant thereby causing a linear voltage variation instead of an exponential voltage variation.

In carrying out my invention in its preferred form I utilize a two-stage cathode-coupled-vacuum-tube amplifier adjusted for substantially unity gain, and I couple such an amplifier between the sweep wave condenser and a portion of the charging current carrying resistor. In this manner I cause a point in the resistor to vary in potential the same amount as the end of the resistor connected to the condenser, so that a fixed potential difference is maintained in a portion of the resistor and thereby charging current is caused to remain constant.

A better understanding of my invention will be afforded by the following detailed description considered in conjunction with the accompanying drawings, and those features of the invention which are believed to be novel and patentable will be pointed out in the claims appended thereto.

In the drawings.

Like reference characters are utilized throughout the drawings to designate like parts.

Figure 1:
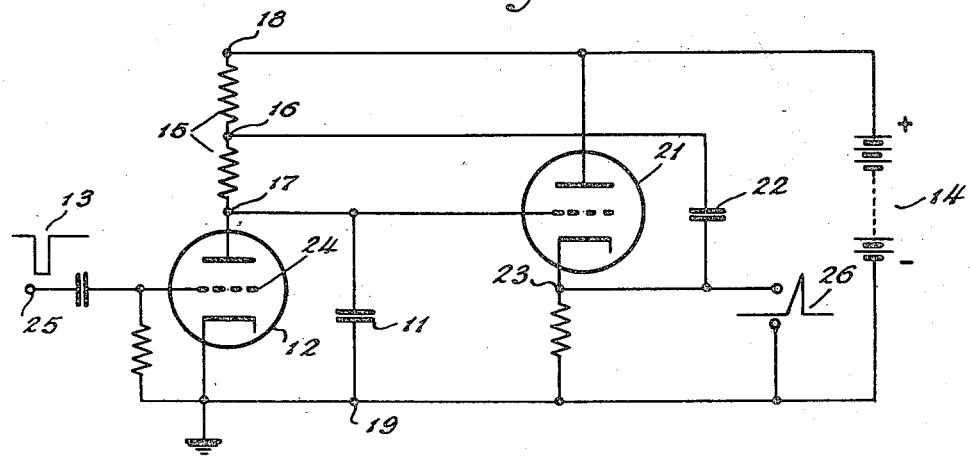
Fig. 1 is a circuit diagram of apparatus for producing an approximately linear sweep by utilizing a very large condenser for maintaining a reasonable degree of constancy of voltage between two points in the charging current carrying resistor.

The arrangement of Fig. 1 comprises a sweep condenser 11, with a discharge element 12 for the condenser taking the form of a three-electrode electric discharge device such as a triode vacuum tube, adapted to be triggered by an external synchronizing source represented by a negative rectangular wave 13. For charging the condenser 11 a source of direct current 14 is provided which is connected to the condenser 11 in series with a resistor 15 having an intermediate terminal 16 and end terminals 17 and 18. The end terminal 17 is connected to the condenser 11 and to the discharge device 12. The end terminal 18 of the resistor 15 is connected to the voltage supply source 14, and the condenser 11 has a terminal 19 connected to the remaining terminal of the voltage supply 14 and to the remaining terminal of the discharge device 12.

For maintaining substantial constancy of the potential difference between the points 16 and 17 in the charging current carrying resistor 15, a cathode follower stage 21 and a potential holding condenser 22 are provided. The cathode follower 21 has a cathode terminal 23 connected to one terminal of the condenser 22 and the other terminal of the condenser 22 is connected to the intermediate terminal 16 of the charging current carrying resistor 15. Although this arrangement does not produce a high degree of constancy of potential difference between points 16 and 17 unless the condenser 22 is made very large, the potential of the point 16 will tend to rise in conformity with the rise in potential of the upper terminal 17 of the sweep condenser 11 since the potential of the cathode terminal 23 of the cathode follower 21 tends to follow the input potential.

The triode 12 is shown as having an anode and a cathode connected respectively to the terminals 17 and 19 and a control electrode 24 capacitively coupled to an input terminal 25 to which the negative rectangular wave 13 may be applied. If the wave 13 is a negative wave of short duration, it will intermittently drive the control grid 24 sharply negative rendering the tube 12 nonconducting and for the duration of the negative portion of the wave 13, it will permit the condenser 11 to be charged through the resistor 15. Owing to the great size of the condenser 22, the potential between the points 16 and 17 varies relatively little and an approximately linear sweep wave 26 appears between the cathode terminal 23 of the cathode follower 21 and the negative or ground terminal 19.

Figure 2:
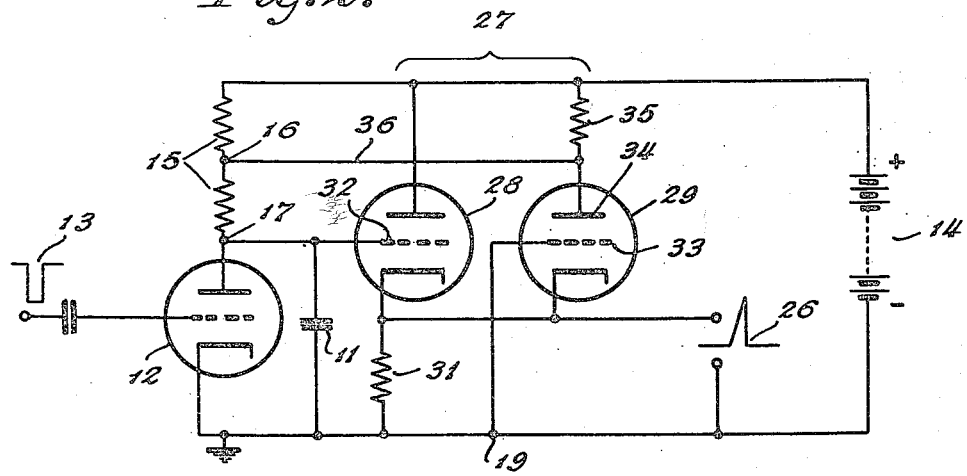
Fig. 2 is a circuit diagram of a servo sweep circuit requiring no coupling condensers and utilizing only a sweep condenser, the voltage across which represents the sweep voltages.

I have found that a higher degree of linearity of the sweep may be obtained and the need for the relatively bulky and costly large-capacitance condenser may be overcome by utilizing an electronic voltage control circuit for maintaining fixed potential difference between the charging current carrying resistor terminals 16 and 17. For example, as illustrated in Fig. 2, I may employ a 2-stage cathode coupled unity gain vacuum tube amplifier 27 receiving its input from the upper terminal 17 of the sweep condenser 11 and supplying its output to the intermediate terminal 16 of the resistor 15.

As shown, the amplifier 27 comprises a pair of cathode-coupled tubes 28 and 29, with a common cathode resistor 31. The tube 28 is connected in series with the resistor 31 across the power supply 14 as a cathode follower having a control electrode 32 connected to the terminal 17 which is common to the resistor 15, the anode of the tube 12 and the upper terminal of the sweep condenser 11. The tube 29 has a control grid 33 connected to the negative terminal of the power supply 14 and an anode 34 connected in series with a load resistor 35 to the positive terminal of the power supply 14. The anode 34 is connected to the intermediate terminal 16 of the resistor 15 through a conductor 36.

Owing to the connection of the grid 33 to the negative power supply terminal, the tube 29 has cathode control. The current through the tube 29 is reduced, raising the potential of the anode 34, as the cathode potential of the tubes 28 and 29 follows the rising sweep voltage across the condenser 11 while the condenser 11 is being charged through the resistor 15. It will be understood that this charging takes place only during the time that tube 12 is cut off by the negative rectangular wave 13. The resistances of the resistors 31 and 35 are so chosen in relation to the characteristics of the tubes 28 and 29 as to produce an overall gain of substantially unity. It will be understood that the unavoidable slightly less than unity gain of the cathode follower 28 may be compensated by making the gain of the tube 29 slightly greater than unity. For the sake of simplicity in the drawing, a single common cathode resistor 31 has been shown in the arrangement of Fig. 2. It will be understood, however, that where greater refinement is desired a composite cathode resistor connection may be employed for more exactly setting the overall gain at unity. Such a modified cathode connection will be described more in detail in connection with the arrangement of Fig. 3.

Figure 3:
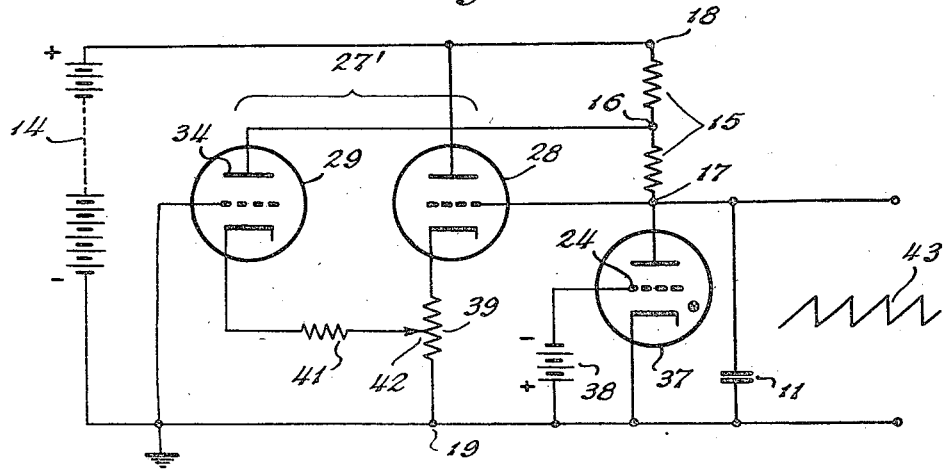
Fig. 3 is a circuit diagram of a sawtooth wave sweep generator utilizing a self-discharging element for discharging the sweep condenser.

Although I have referred particularly to an arrangement in which the sweep wave is a rising voltage wave and the sweep wave is produced while controlled current is passed through the sweep condenser in such a direction as to increase the potential difference across the condenser, it will be understood that my invention is not limited to the specific arrangement described and illustrated.

Where a sawtooth wave is desired, and it is desired that the wave shall be produced without the need of a controlling rectangular wave, a sweep condenser 11 with a discharging element 37 may be employed as shown in Figure 3. Synchronizing signals may be applied to the grid 24 of tube 37 in the normal manner. However, in this case also, linearity of sweep depends upon provision for means of maintaining the charging current substantially constant.

The discharging element 37 may be of the voltage responsive two-electrode ionic discharge type which breaks down whenever a predetermined condenser voltage is attained, but is shown as being of the three-electrode type for the sake of greater accuracy in setting the triggering voltage. For example, the self-discharging element 37 may be of the gaseous or vapor discharge type such as a thyratron type of tube having its control electrode 24 negatively biased by means of a "C" battery 38.

In this case a slightly modified unity-gain amplifier 27' of the cathode coupled type is employed. It comprises a pair of triodes 28 and 29, as in Fig. 2, with the anode 34 of the tube 29 connected directly to the intermediate terminal 16 of the resistor 15 so that the portion of the resistor 15 between terminals 16 and 18 acts as a load resistor for the tube 29. For enabling the amount of gain to be adjusted and for more accurately setting the gain at unity, a cathode resistor 39 is provided in series with the tube 28 and a separate cathode resistor 41 is provided for the tube 29 being connected by means of a slidable tap 42 to the resistor 39. In this manner the portion of the resistor 39 between the tap 42 and the ground terminal 19 serves as a common cathode resistor for the tubes 28 and 29 and the remaining portion of the resistor 39, like the resistor 41, serves as an individual portion of the cathode circuit resistances of the tubes 28 and 29 respectively.

I believe that the most convenient way of setting the amplifier 27' for unity gain is to observe the wave form of the sawtooth output wave 43 appearing across the sweep condenser 11, and to adjust tap 42 up and down until the greatest degree of linearity of sweep 43 is obtained.

Figure 4:
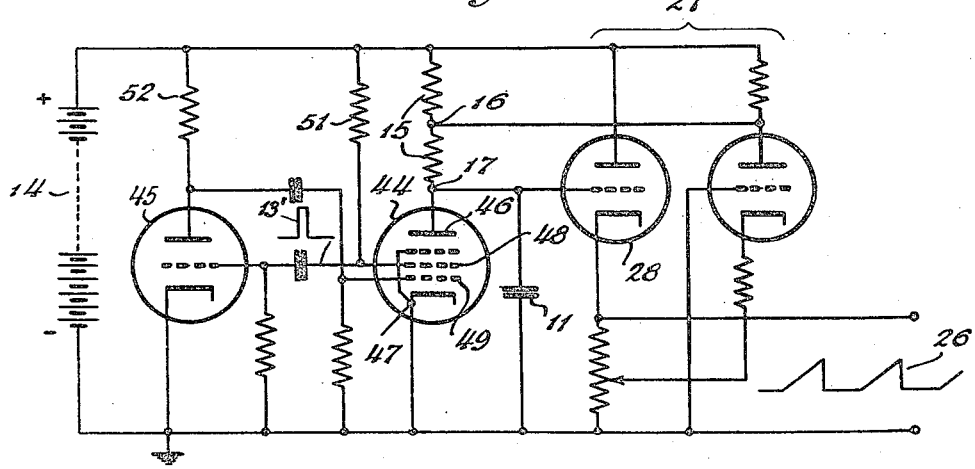
Fig. 4 is a diagram of a sweep circuit producing a linear servo sweep or synchro-sweep without requiring external synchronizing means.

Although the servo- or synchro-sweep type of wave form 26, shown in Fig. 2, may readily be obtained where a controlling rectangular wave is available, the invention is not limited to producing such a sweep wave in response to such a controlling wave. Such a sweep wave may also be produced by means of a self-oscillatory circuit as illustrated in Fig. 4, for example. In this case a substantially unity gain amplifier 27', such as described in connection with Fig. 3, is used together with the sweep condenser 11, and a controlled condenser-discharging tube 44. For controlling the rate of alternation between the charging and discharging conditions of the tube 44 and for controlling the duration of the non-conducting period thereof, a suitable type of oscillator, such as a multivibrator circuit, for example, may be employed. For the sake of compactness, the tube 44 may be a multigrid tube, some of the elements acting as a triode and forming one of the stages of the multivibrator circuit, the other stage of which may take the form of a single triode 45.

The tube 44 is shown as a pentode having an anode 46 and a cathode 47 connected across the sweep condenser 11 to serve as the discharge tube therefor, having a conventional suppressor grid, a screen grid 48 and a No. 1 or control grid 49 with respect to which the screen grid 48 acts as an anode. A customary load resistor 51 is connected between the screen grid 48 and the positive terminal of the power supply 14 and a similar load resistor 52 is provided for the tube 45. Conventional resistance capacitance cross-coupling is provided between the tube 45 and the portion of the tube 44 represented by the electrodes 47, 48 and 49.

As relaxation oscillation takes place a positive rectangular wave 13' appears on the screen grid 48 corresponding to the period of time that the control grid 49 is below cut-off potential. By electron coupling, a similar wave form appears at the anode 46, the discharge space between the anode 46 and the cathode 47 of the tube 44 being caused to become non-conducting for the duration of the square wave 13'. During the remaining period of time when the grid 49 is at ground potential the discharge space between the anode 46 and the cathode 47 holds the condenser 11 discharged. During the period of time that the tube 44 is non-conducting, the condenser 11 is charged through the resistor 15 in the same manner as described in connection with Figs. 2 and 3 and the potential difference between the terminals 16 and 17 is held constant by the unity gain amplifier 27', as described in connection with Figs. 2 and 3, so that a high degree of linearity is obtained from the sweep wave 26 which may be taken from the condenser 11 or from the cathode of the tube 28.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. In combination, a capacitor and a resistor in series, means for causing a current to flow in a first direction through said capacitor and said resistor, means for causing a current to flow in a second direction through said capacitor only, and means responsive to the voltage drop across said capacitor for maintaining the voltage drop across at least a portion of said resistor substantially constant during the flow of current in said first direction.

2. In combination, a capacitor and a resistor in series, means for causing a current to flow in a first direction through said capacitor and said resistor, means for causing a current to flow in a second direction through said capacitor only, and variable-resistance means in shunt with at least a portion of said resistor and responsive to the voltage drop across said capacitor for maintaining the voltage drop across said portion substantially constant during the flow of current in said first direction.

3. In combination, a capacitor and a resistor in series, means for passing a charging current through said capacitor and resistor, means for passing a discharging current through said capacitor only, and means responsive to the voltage drop across said capacitor for maintaining the voltage drop across at least a portion of said resistor substantially constant during the flow of said charging current.

4. Apparatus for producing saw-tooth waves, comprising in combination a sweep condenser, a discharge device connected thereto, means for intermittently rendering the discharge device non-conducting, a resistor connected in series with the condenser with connections for passing charging current through the condenser, and a substantially unity gain amplifier coupling said sweep condenser to a predetermined point in said resistor for maintaining substantially constant voltage drop between two points in the resistor and thereby maintaining substantially constant charging current.

5. Apparatus as in the preceding claim, wherein the substantially unity gain amplifier comprises a pair of cathode-coupled vacuum tube stages having a common cathode resistor, one of said stages having an anode connected to a point in the series condenser charging resistor, and the other of said stages having a control electrode coupled to the sweep condenser.

6. Apparatus for producing saw-tooth waves, comprising in combination a sweep condenser, a discharge device connected thereto and adapted to be alternately conducting and non-conducting, a charging current carrying resistor in series with the condenser, and a unity gain amplifier coupled between the sweep condenser and a predetermined point in the resistor for maintaining substantially constant potential difference between two points in the series resistor to maintain the charging current substantially constant.

7. Apparatus for producing saw-tooth sweep waves, comprising in combination a sweep condenser, a voltage-responsive discharge device connected thereto, a charging-current-carrying resistor in series with the condenser, said resistor having an intermediate terminal, and a substantially unity gain amplifier interconnecting said sweep wave condenser and said intermediate resistor terminal for maintaining substantially constant potential difference in a portion of said resistor between said terminal and said condenser for maintaining substantially constant charging current in the condenser to produce linear sweep.

8. Apparatus as in the preceding claim wherein the unity gain amplifier comprises a pair of vacuum tube stages, one of which has an anode connected to said resistor intermediate terminal and a control electrode connected to the low-potential side of the condenser, and the other of which has a control electrode connected to the high potential side of the condenser, said vacuum tube stages being cathode coupled with cathode resistances partially in common.

9. In combination, a condenser, a charging current carrying resistor in series connection therewith, and a pair of cathode-coupled vacuum tube stages, one of which is connected across the series unit consisting of the resistor and the condenser, and the other of which is connected across the condenser and only a portion of the resistor, said vacuum tube stages having control electrodes each connected to one side of the condenser and having cathode resistors partly in common, said resistors being adjusted for substantially unity gain of the vacuum tube stages.

10. Apparatus for producing saw-tooth waves, comprising in combination a sweep condenser, a multivibrator triggering and discharge circuit for said condenser, a charging-current-carrying resistor in series with said condenser, and a substantially unity gain amplifier coupled between said condenser and a predetermined point in said resistor for maintaining the potential difference between said predetermined point and one end terminal of the resistor substantially constant for causing the charging current to remain substantially constant.

11. In combination, a condenser, a resistor in series therewith, means for alternately passing current in one direction through said condenser, and in the opposite direction through said condenser and said resistor in series, and means for controlling potential difference between two points in the resistor.

12. In combination, a condenser, means for alternately passing currents of opposite directions through said condenser, and means for holding one of said currents substantially constant.

HUGHES M. ZENOR.

REFERENCES CITED

The following references are of record in the file of this patent:

UNITED STATES PATENTS

| Number | Name | Date |
|---|---|---|
| 1,978,461 | Hoover et al. | Oct. 30, 1934 |
| 2,085,100 | Knowles et al. | June 29, 1937 |
| 2,287,540 | Vang | June 23, 1942 |
| 2,295,293 | Rogers | Sept. 8, 1942 |
| 2,306,230 | Somerville | Dec. 22, 1942 |
| 2,320,916 | Dawson | June 1, 1943 |
| 2,340,880 | Keinath | Feb. 8, 1944 |
| 2,353,733 | Klemperer | July 18, 1944 |
| 2,354,768 | Nokes | Aug. 1, 1944 |

FOREIGN PATENTS

| Number | Country | Date |
|---|---|---|
| 792,921 | France | Nov. 7, 1935 |